United States Patent
Kim et al.

(10) Patent No.: US 7,311,228 B2
(45) Date of Patent: *Dec. 25, 2007

(54) LIQUID CRYSTAL DISPENSING APPARATUS

(75) Inventors: Wan-Soo Kim, Gyeonggi-do (KR);
Hyug-Jin Kweon, Kyoungsangbuk-do (KR); Hae-Joon Son, Pusan (KR)

(73) Assignee: LG.Philips LCD Co., Ltd., Seoul (KR)

( * ) Notice: Subject to any disclaimer, the term of this patent is extended or adjusted under 35 U.S.C. 154(b) by 172 days.

This patent is subject to a terminal disclaimer.

(21) Appl. No.: 10/929,453

(22) Filed: Aug. 31, 2004

(65) Prior Publication Data

US 2005/0030470 A1    Feb. 10, 2005

Related U.S. Application Data

(63) Continuation of application No. 10/128,233, filed on Apr. 24, 2002, now Pat. No. 6,824,023.

(30) Foreign Application Priority Data

Feb. 20, 2002  (KR) ................. 2002-9122
Feb. 27, 2002  (KR) ................. 2002-10617

(51) Int. Cl.
*B67D 3/00*    (2006.01)

(52) U.S. Cl. ............... 222/504; 222/420; 222/518

(58) Field of Classification Search ............. 222/504, 222/518, 394, 420; 239/585.5, 583, 581.2, 239/582.1; 251/129.15, 129.01, 129.22, 251/129.1; 335/219, 301

See application file for complete search history.

(56) References Cited

U.S. PATENT DOCUMENTS

| | | | |
|---|---|---|---|
| 3,366,288 A * | 1/1968 | Goldschein | 222/504 |
| 3,978,580 A | 9/1976 | Leupp et al. | |
| 4,071,641 A | 1/1978 | Susai | 427/234 |
| 4,094,058 A | 6/1978 | Yasutake et al. | 29/592 R |
| 4,653,864 A | 3/1987 | Baron et al. | |
| 4,691,995 A | 9/1987 | Yamazaki et al. | 350/331 R |
| 4,775,225 A | 10/1988 | Tsuboyama et al. | |
| 5,074,443 A | 12/1991 | Fujii et al. | 222/639 |
| 5,247,377 A | 9/1993 | Omeis et al. | 359/76 |
| 5,263,888 A | 11/1993 | Ishihara et al. | |
| 5,334,353 A | 8/1994 | Blattner | 422/100 |
| 5,379,139 A | 1/1995 | Sato et al. | |
| 5,406,989 A | 4/1995 | Abe | |
| 5,499,128 A | 3/1996 | Hasegawa et al. | |
| 5,507,323 A | 4/1996 | Abe | |
| 5,511,591 A | 4/1996 | Abe | 141/7 |

(Continued)

FOREIGN PATENT DOCUMENTS

CN   1038968 A   1/1990

(Continued)

*Primary Examiner*—Frederick C. Nicolas
(74) *Attorney, Agent, or Firm*—McKenna Long & Aldridge LLP (57) ABSTRACT

A liquid crystal dispensing apparatus for dispensing liquid crystal onto a substrate includes a liquid crystal container, a nozzle structure, and a valve structure. The liquid crystal container contains the liquid crystal to be dispensed. The nozzle structure is disposed at a lower portion of the liquid crystal container, and the liquid crystal is dispensed through the nozzle structure onto the substrate. The valve structure is disposed to control flow of the liquid crystal from the liquid crystal container to the nozzle structure in accordance with a gas pressure provided from a gas input of the liquid crystal container. The liquid crystal container may be formed of substantially entirely of metal. An inside surface of the liquid crystal container may include a fluorine resin.

2 Claims, 7 Drawing Sheets

U.S. PATENT DOCUMENTS

| | | | |
|---|---|---|---|
| 5,539,545 A | 7/1996 | Shimizu et al. | |
| 5,548,429 A | 8/1996 | Tsujita | |
| 5,642,214 A | 6/1997 | Ishii et al. | 349/96 |
| 5,680,189 A | 10/1997 | Shimizu et al. | |
| 5,742,370 A | 4/1998 | Kim et al. | 349/124 |
| 5,757,451 A | 5/1998 | Miyazaki et al. | |
| 5,852,484 A | 12/1998 | Inoue et al. | |
| 5,854,664 A | 12/1998 | Inoue et al. | |
| 5,861,932 A | 1/1999 | Inata et al. | |
| 5,875,922 A | 3/1999 | Chastine et al. | 222/1 |
| 5,952,676 A | 9/1999 | Sato et al. | |
| 5,956,112 A | 9/1999 | Fujimori et al. | |
| 6,001,203 A | 12/1999 | Yamada et al. | |
| 6,011,609 A | 1/2000 | Kato et al. | 349/190 |
| 6,016,178 A | 1/2000 | Kataoka et al. | 349/117 |
| 6,016,181 A | 1/2000 | Shimada | |
| 6,055,035 A | 4/2000 | Von Gutfeld et al. | 349/187 |
| 6,060,125 A | 5/2000 | Fujii | 427/421 |
| 6,163,357 A | 12/2000 | Nakamura | 349/155 |
| 6,219,126 B1 | 4/2001 | Von Gutfeld | |
| 6,226,067 B1 | 5/2001 | Nishiguchi et al. | 349/155 |
| 6,236,445 B1 | 5/2001 | Foschaar et al. | |
| 6,250,515 B1 | 6/2001 | Newbold et al. | 222/504 |
| 6,304,306 B1 | 10/2001 | Shiomi et al. | 349/88 |
| 6,304,311 B1 | 10/2001 | Egami et al. | 349/189 |
| 6,337,730 B1 | 1/2002 | Ozaki et al. | |
| 6,414,733 B1 | 7/2002 | Ishikawa et al. | 349/110 |
| 6,601,364 B2 | 8/2003 | Sussmeier | 427/256 |
| 6,824,023 B2 * | 11/2004 | Kim et al. | 222/504 |
| 6,827,240 B2 * | 12/2004 | Kim et al. | 222/394 |
| 2001/0021000 A1 | 9/2001 | Egami | 349/187 |

FOREIGN PATENT DOCUMENTS

| | | |
|---|---|---|
| CN | 1322783 A | 11/2001 |
| JP | 51-65656 | 6/1976 |
| JP | 52-149725 | 12/1977 |
| JP | 57-38414 | 3/1982 |
| JP | 57-88428 | 6/1982 |
| JP | 58-27126 | 2/1983 |
| JP | 59-057221 | 4/1984 |
| JP | 59-195222 | 11/1984 |
| JP | 60-111221 | 6/1985 |
| JP | 60-164723 | 8/1985 |
| JP | 60-217343 | 10/1985 |
| JP | 61-7822 | 1/1986 |
| JP | 61-55625 | 3/1986 |
| JP | 62-89025 | 4/1987 |
| JP | 62-90622 | 4/1987 |
| JP | 62-205319 | 9/1987 |
| JP | 63-109413 | 5/1988 |
| JP | 63-110425 | 5/1988 |
| JP | 63-128315 | 5/1988 |
| JP | 63-311233 | 12/1988 |
| JP | 5-127179 | 5/1993 |
| JP | 5-154923 A | 6/1993 |
| JP | 5-265011 | 10/1993 |
| JP | 5-281557 | 10/1993 |
| JP | 5-281562 | 10/1993 |
| JP | 6-51256 | 2/1994 |
| JP | 06-079213 | 3/1994 |
| JP | 6-148657 | 5/1994 |
| JP | 6-160871 | 6/1994 |
| JP | 6-235925 A | 8/1994 |
| JP | 6-265915 | 9/1994 |
| JP | 6-313870 A | 11/1994 |
| JP | 7-84268 A | 3/1995 |
| JP | 7-128674 | 5/1995 |
| JP | 7-181507 | 7/1995 |
| JP | 8-95066 | 4/1996 |
| JP | 8-101395 A | 4/1996 |
| JP | 8-106101 | 4/1996 |
| JP | 08-122122 | 5/1996 |
| JP | 8-171094 | 7/1996 |
| JP | 8-190099 | 7/1996 |
| JP | 8-240807 | 9/1996 |
| JP | 9-5762 | 1/1997 |
| JP | 9-26578 | 1/1997 |
| JP | 9-61829 A | 3/1997 |
| JP | 9-73075 | 3/1997 |
| JP | 9-73096 | 3/1997 |
| JP | 9-127528 | 5/1997 |
| JP | 9-230357 | 9/1997 |
| JP | 9-281511 | 10/1997 |
| JP | 9-311340 | 12/1997 |
| JP | 10-123537 | 5/1998 |
| JP | 10-123538 | 5/1998 |
| JP | 10-142616 | 5/1998 |
| JP | 10-177178 A | 6/1998 |
| JP | 7-33907 | 8/1998 |
| JP | 10-221700 | 8/1998 |
| JP | 10-282512 | 10/1998 |
| JP | 10-333157 A | 12/1998 |
| JP | 10-333159 A | 12/1998 |
| JP | 11-14953 | 1/1999 |
| JP | 11-38424 | 2/1999 |
| JP | 11-64811 | 3/1999 |
| JP | 11-109388 | 4/1999 |
| JP | 11-133438 A | 5/1999 |
| JP | 11-142864 A | 5/1999 |
| JP | 11-174477 | 7/1999 |
| JP | 11-212045 | 8/1999 |
| JP | 11-248930 A | 9/1999 |
| JP | 11-326922 A | 11/1999 |
| JP | 11-342357 | 12/1999 |
| JP | 11-344714 | 12/1999 |
| JP | 2000-2879 A | 1/2000 |
| JP | 2000-29035 | 1/2000 |
| JP | 2000-53611 A | 2/2000 |
| JP | 2000-66165 A | 3/2000 |
| JP | 2000-137235 A | 5/2000 |
| JP | 2000-147528 A | 5/2000 |
| JP | EP 1 003 066 A1 | 5/2000 |
| JP | 2000-193988 A | 7/2000 |
| JP | 2000-241824 A | 9/2000 |
| JP | 2000-284295 A | 10/2000 |
| JP | 2000-292799 A | 10/2000 |
| JP | 2000-310759 A | 11/2000 |
| JP | 2000-310784 A | 11/2000 |
| JP | 2000-335201 A | 12/2000 |
| JP | 2001-5401 A | 1/2001 |
| JP | 2001-5405 A | 1/2001 |
| JP | 2001-13506 A | 1/2001 |
| JP | 2001-33793 A | 2/2001 |
| JP | 2001-42341 A | 2/2001 |
| JP | 2001-51284 A | 2/2001 |
| JP | 2001-66615 A | 3/2001 |
| JP | 2001-91727 A | 4/2001 |
| JP | 2001-117105 | 4/2001 |
| JP | 2001-117109 A | 4/2001 |
| JP | 2001-133745 A | 5/2001 |
| JP | 2001-133794 | 5/2001 |
| JP | 2001-133799 A | 5/2001 |
| JP | 2001-142074 | 5/2001 |
| JP | 2001-147437 | 5/2001 |
| JP | 2001-154211 | 6/2001 |
| JP | 2001-166272 A | 6/2001 |
| JP | 2001-166310 A | 6/2001 |
| JP | 2001-183683 A | 7/2001 |
| JP | 2001-201750 A | 7/2001 |
| JP | 2001-209052 A | 8/2001 |
| JP | 2001-209060 A | 8/2001 |
| JP | 2001-215459 A | 8/2001 |
| JP | 2001-222017 A | 8/2001 |

| | | | | | | |
|---|---|---|---|---|---|---|
| JP | 2001-235758 A | 8/2001 | | JP | 2002-49045 | 2/2002 |
| JP | 2001-255542 | 9/2001 | | JP | 2002-82340 | 3/2002 |
| JP | 2001-264782 | 9/2001 | | JP | 2002-90759 | 3/2002 |
| JP | 2001-272640 A | 10/2001 | | JP | 2002-90760 | 3/2002 |
| JP | 2001-281675 A | 10/2001 | | JP | 2002-107740 | 4/2002 |
| JP | 2001-281678 A | 10/2001 | | JP | 2002-122872 | 4/2002 |
| JP | 2001-282126 A | 10/2001 | | JP | 2002-122873 | 4/2002 |
| JP | 2001-305563 A | 10/2001 | | JP | 2002-139734 | 5/2002 |
| JP | 2001-330837 A | 11/2001 | | JP | 2002-202512 | 7/2002 |
| JP | 2001-330840 | 11/2001 | | JP | 2002-202514 | 7/2002 |
| JP | 2001-356353 A | 12/2001 | | JP | 2002-214626 | 7/2002 |
| JP | 2001-356354 | 12/2001 | | KR | 2000-0035302 A | 6/2000 |
| JP | 2002-14360 | 1/2002 | | | | |
| JP | 2002-23176 | 1/2002 | | * cited by examiner | | |

LIQUID CRYSTAL DISPENSING APPARATUS

This is a continuation of application Ser. No. 10/128,233, filed on Apr. 24, 2002 now U.S. Pat. No. 6,824,023.

The present application claims the benefit of Korean Patent Application Nos. 9122/2002 and 10617/2002 respectively filed in Korea on Feb. 20, 2002 and Feb. 27, 2002, both of which are hereby incorporated by reference.

BACKGROUND OF THE INVENTION

1. Field of the Invention

The present invention relates to a liquid crystal dispensing apparatus, and particularly, to a liquid crystal dispensing apparatus that has a simple structure and that can drop liquid crystal at an exact position on a substrate.

2. Discussion of the Related Art

Recently, various portable electric devices such as mobile phones, personal digital assistants (PDA), and notebook computers have been developed, and therefore, needs for a flat panel display device for use in a small, light and power-efficient device are correspondingly increasing. To meet the needs, flat panel display devices such as liquid crystal displays (LCD), plasma display panels (PDP), field emission displays (FED), and vacuum fluorescent displays (VFD) have been actively researched. Of these flat panel display devices, the LCD is highlighted due to current mass production, easiness in a driving scheme, and realization of superior image quality.

Figure 1:
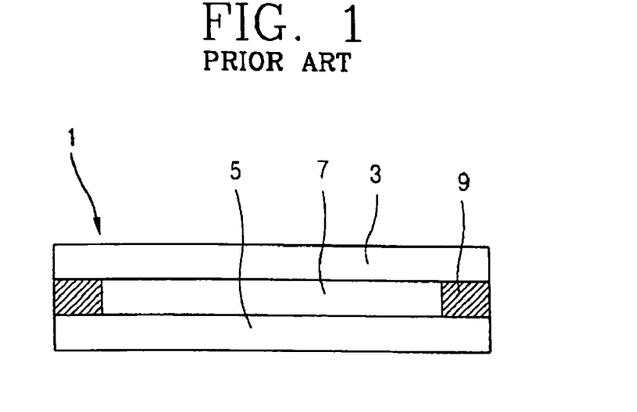
FIG. 1 is a cross-sectional view showing a general LCD.

The LCD is a device for displaying information on a screen using refractive anisotropy of liquid crystal. As shown in FIG. 1, the LCD 1 comprises a lower substrate 5, an upper substrate 3, and a liquid crystal layer 7 formed between the lower substrate 5 and the upper substrate 3. The lower substrate 5 is a driving device array substrate. A plurality of pixels (not shown) are formed on the lower substrate 5, and a driving device such as a thin film transistor (TFT) is formed on each pixel. The upper substrate 3 is a color filter substrate, and a color filter layer for reproducing real color is formed thereon. Further, a pixel electrode and a common electrode are formed on the lower substrate 5 and the upper substrate 3 respectively. An alignment layer is formed on the lower substrate 5 and the upper substrate 3 to align liquid crystal molecules of the liquid crystal layer 7 uniformly.

The lower substrate 5 and the upper substrate 3 are attached by a sealing material 9, and the liquid crystal layer 7 is formed therebetween. In addition, the liquid crystal molecules are reoriented by the driving device formed on the lower substrate 5 to control the amount of light transmitting through the liquid crystal layer, thereby displaying information.

Fabrication processes for a LCD device can be divided into a driving device array substrate process for forming the driving device on the lower substrate 5, a color filter substrate process for forming the color filter on the upper substrate 3, and a cell process. These processes will be described with reference to FIG. 2 as follows.

Figure 2:
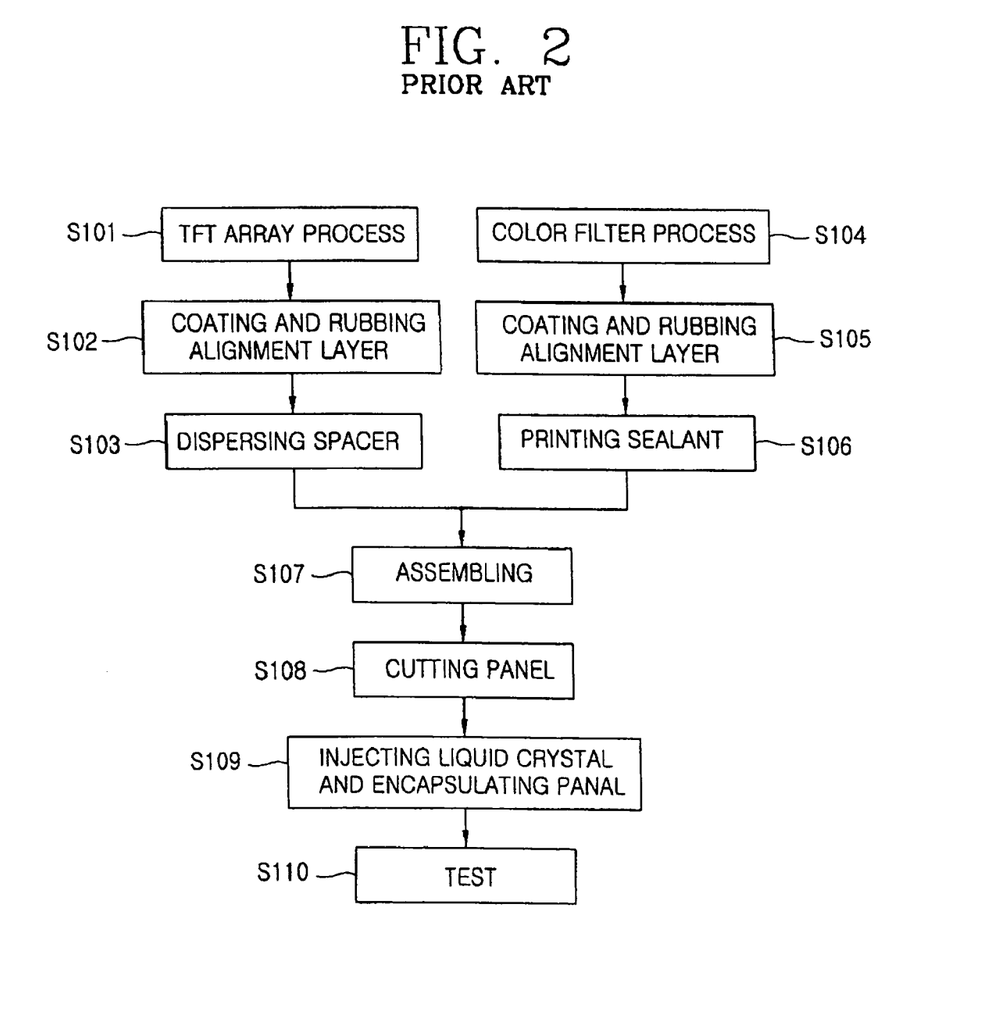
FIG. 2 is a flow chart showing a conventional method for fabricating the LCD.

Initially, a plurality of gate lines and data lines are formed on the lower substrate 5 to define a pixel area by the driving device array process and the thin film transistor connected to both the gate line and the data line is formed on the each pixel area (S101). Also, a pixel electrode, which is connected to the thin film transistor to drive the liquid crystal layer according to a signal applied through the thin film transistor, is formed by the driving device array process. R (Red), G (Green), and B (Blue) color filter layers for reproducing the color and a common electrode are formed on the upper substrate 3 by the color filter process (S104). In addition, the alignment layer is formed on the lower substrate 5 and the upper substrate 3 respectively, and then the alignment layer is rubbed to induce surface anchoring (that is, a pretilt angle and alignment direction) for the liquid crystal molecules of the liquid crystal layer between the lower substrate 5 and the upper substrate 3 (S102 and S105). Thereafter, a spacer for maintaining the cell gap constant and uniform is dispersed onto the lower substrate 5. Then, the sealing material is applied onto outer portion of the upper substrate 3 to attach the lower substrate 5 and the upper substrate 3 by compression (S103, S106, and S107).

On the other hand, the lower substrate 5 and the upper substrate 3 are made from a glass substrate of larger area. That is, the large glass substrate includes a plurality of unit panel areas on which the driving device such as TFT and the color filter layer are formed. To fabricate the individual liquid crystal display unit panel, the assembled glass substrates should be cut into unit panels (S108). Thereafter, the liquid crystal is injected into the empty individual liquid crystal display unit panel through a liquid crystal injection opening (S109). The filled liquid crystal display unit panel is completed by sealing the liquid crystal injection opening, and each liquid crystal display unit panel is inspected, thereby completing the LCD device (S109 and S110).

Figure 3:
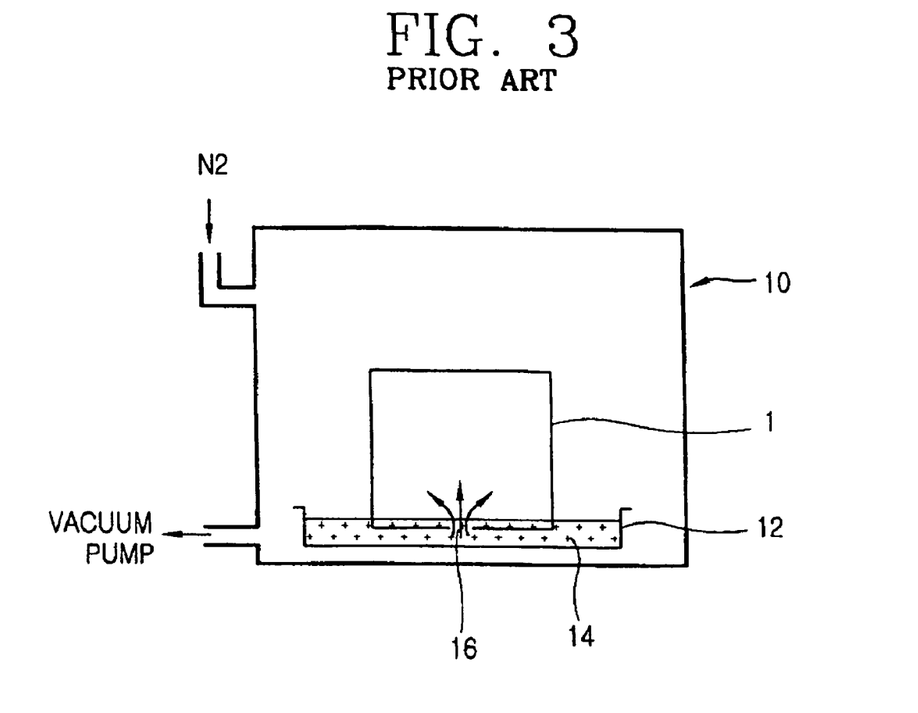
FIG. 3 is a view showing liquid crystal injection in the conventional method for fabricating the LCD.

As described above, the liquid crystal is injected through the liquid crystal injection opening. The injection of the liquid crystal is induced by a pressure difference. FIG. 3 shows a device for injecting the liquid crystal into the liquid crystal display panel. As shown in FIG. 3, a container 12 in which the liquid crystal is contained is placed in a vacuum chamber 10, and the liquid crystal display panel is located on an upper side of the container 12. The vacuum chamber 10 is connected to a vacuum pump to maintain a predetermined vacuum state. Further, a liquid crystal display panel moving device (not shown) is installed in the vacuum chamber 10 to move the liquid crystal display panel from the upper side of the container 12 to the surface of the liquid crystal to contact an injection opening 16 of the liquid crystal display panel 1 with the liquid crystal 14 (this method is called as liquid crystal dipping injection method).

When the vacuum degree within the chamber 10 is decreased by inflowing nitrogen gas (N2) into the vacuum chamber 10 in the state that the injection opening of the liquid crystal display panel 1 contacts with the liquid crystal, the liquid crystal 14 is injected into the panel through the injection opening by the pressure difference between the pressure in the liquid crystal display panel and the pressure in the vacuum chamber. After the liquid crystal is entirely filled into the panel 1, the injection opening 16 is sealed by a sealing material to seal the liquid crystal layer (this method is called as vacuum injection method of liquid crystal).

However, there are several some problems in the liquid crystal dipping injection method and/or vacuum injection method as follows.

First, time for the liquid crystal injection into the panel 1 is increased. Generally, a gap thickness between the driving device array substrate and the color filter substrate in the liquid crystal display panel is very narrow as order of magnitude of micrometers, and therefore, a very small amount of liquid crystal is injected into the liquid crystal display panel per unit time. For example, it takes about 8 hours to inject the liquid crystal completely in fabrication process of the 15 inches-liquid crystal display panel 15, the liquid crystal fabrication process time is increased due to the liquid crystal injection of long time, thereby decreasing fabricating efficiency.

Second, the liquid crystal consumption is increased in the above liquid crystal injection method. A small amount of liquid crystal out of the liquid crystal contained in the container 12 is injected into the liquid crystal display panel 10. On the other hand, when the liquid crystal is exposed to atmosphere or to a certain gas, the liquid crystal is contaminated by reaction with the gas. Therefore, the remaining liquid crystal should be discarded after the injection when the liquid crystal 14 contained in the container 12 is injected into a plurality of liquid crystal display panels 10, thereby increasing the liquid crystal display panel fabrication cost.

SUMMARY OF THE INVENTION

Accordingly, the present invention is directed to a liquid crystal dispensing apparatus that substantially obviates one or more of the problems due to limitations and disadvantages of the related art.

An object of the present invention is to provide a liquid crystal dispensing apparatus to drop liquid crystal directly onto a substrate including at least one liquid crystal display unit panel area.

Another object of the present invention is to provide a liquid crystal dispensing apparatus to be fabricated easily, to reduce the fabrication cost, and to prevent inferiority of liquid crystal dropping caused by a distortion of liquid crystal container, by forming the liquid crystal container using stainless steel having pressure endurance, and distortion resistance.

Still another object of the present invention is to provide a liquid crystal dispensing apparatus to prevent the liquid crystal from being contaminated by forming a fluorine resin film on inner part of a liquid crystal container.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, a liquid crystal dispensing apparatus for dispensing liquid crystal onto a substrate comprises a liquid crystal container for containing the liquid crystal to be dispensed and having a gas input; a nozzle structure disposed at a lower portion of the liquid crystal container through which the liquid crystal is dispensed onto the substrate; and a valve structure disposed to control flow of the liquid crystal from the liquid crystal container to the nozzle structure in accordance with a gas pressure provided from the gas input, wherein the liquid crystal container is formed of substantially entirely of metal.

In another aspect, liquid crystal dispensing apparatus for dispensing liquid crystal onto a substrate comprises a liquid crystal container for containing the liquid crystal to be dispensed and including a gas input, a fluorine resin film being formed on an inside surface of the liquid crystal container; a nozzle structure disposed at a lower portion of the liquid crystal container through which the liquid crystal is dispensed onto the substrate; and a valve structure disposed to control flow of the liquid crystal from the liquid crystal container to the nozzle structure in accordance with a gas pressure provided from the gas input.

In another aspect, liquid crystal dispensing apparatus for dispensing liquid crystal onto a substrate comprises a liquid crystal container for containing the liquid crystal to be dispensed, the liquid crystal container being formed substantially entirely of a metal with a first fluorine resin film being formed on an inside surface of the liquid crystal container such that the liquid crystal directly contacts the liquid crystal container; a gas supply connected to the container to provide a gas pressure to provide a driving force for dispensing the liquid crystal; a needle sheet formed of a metal and disposed at a lower portion of the liquid crystal container, the needle sheet defining a discharging hole through which the liquid crystal is dispensed to the substrate; and a needle member formed substantially entirely of a ferromagnetic metal with a second fluorine resin film being formed on a surface of the needle member, the needle member being disposed in the liquid crystal container moveable between an up position and a down position; a biasing member to bias the needle member toward the down position in contact with the needle sheet to prevent flow of the liquid crystal though through discharging hole of the needle sheet; a solenoid disposed to provide a magnetic field such that the needle member is moved by a magnetic force to the up position such that flow of the liquid crystal through the discharging hole of the needle sheet is permitted; and a nozzle structure defining a discharging passage therein to dispense liquid crystal drops onto the substrate, the nozzle structure being formed substantially entirely of a metal with a third fluorine resin film formed on the surface of the discharging passage.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

In order to solve the problems of the conventional liquid crystal injection methods such as a liquid crystal dipping method or liquid crystal vacuum injection method, a liquid crystal dropping method has been introduced recently. The liquid crystal dropping method is a method for forming a liquid crystal layer by directly dropping the liquid crystal onto the substrates and spreading the dropped liquid crystal over the entire panel by pressing together the substrates during the assembling process of the substrates, rather than by injecting the liquid crystal into the empty unit panel by the pressure difference between the inner and outer sides of the panel. According to the above liquid crystal dropping method, the liquid crystal is directly dropped onto the substrate in a short time period so that the liquid crystal layer in the LCD of larger area can be formed quickly. In addition, the liquid crystal consumption can be minimized due to the direct dropping of the liquid crystal as much as required amount, thereby reducing the fabrication cost.

Figure 4:
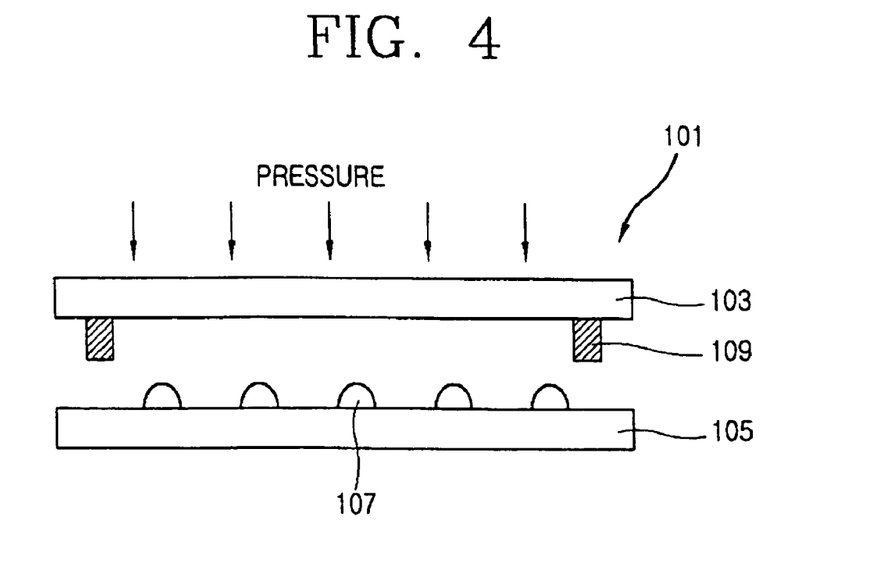
FIG. 4 is a view showing an exemplary LCD fabricated using a method for dropping liquid crystal according to the present invention.

FIG. 4 is a view showing basic concept of the liquid crystal dropping method. As shown in the liquid crystal dropping method, the liquid crystal is dropped onto a lower substrate 105 as a drop shape before assembling the lower substrate 105 and an upper substrate 103 having a driving device and a color filter respectively. Alternatively, the liquid crystal 107 may be dropped onto the substrate 103 on which the color filter is formed. That is, the liquid crystal may be formed either on a TFT (thin film transistor) substrate or on a CF (color filter) substrate. However, the substrate on which the liquid crystal is dropped should preferably be located on the lower part when the liquid crystal is dropped and the substrates are assembled.

A sealing material 109 is applied on an outer part of the upper substrate 103. The upper substrate 103 and the lower substrate 105 are then attached as the upper substrate 103 and the lower substrate 105 are compressed together. At the same time, the liquid crystal drops 107 spread out by the pressure, thereby forming a liquid crystal layer of uniform thickness between the upper substrate 103 and the lower substrate 105. That is, with the liquid crystal dropping method, the liquid crystal 107 is dropped onto the lower substrate 105 before the panel 101 is assembled.

Figure 5:
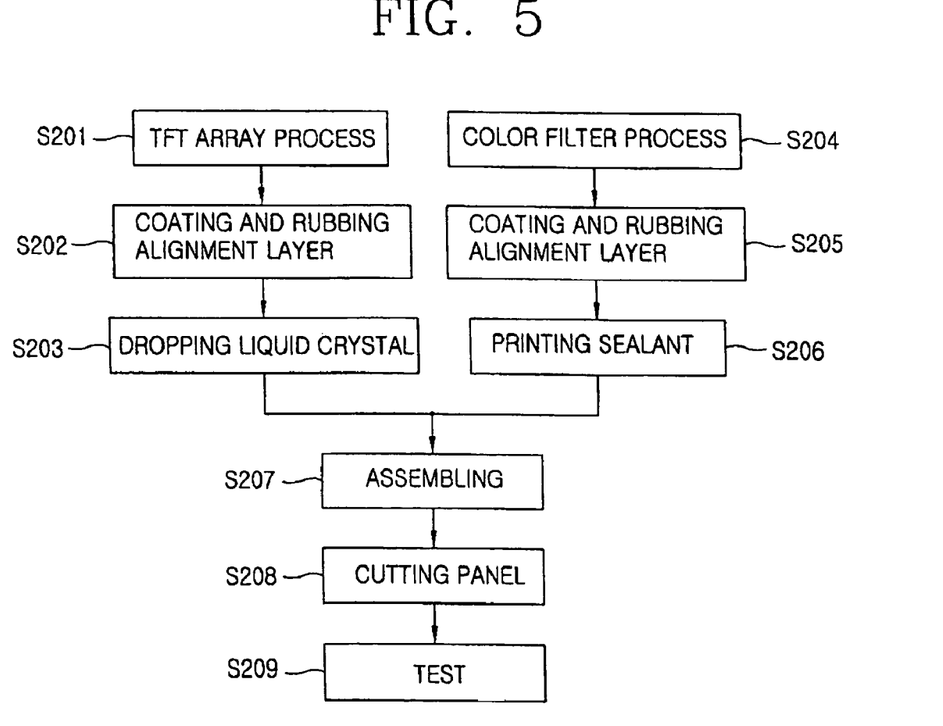
FIG. 5 is a flow chart showing an exemplary method for fabricating the LCD according to the liquid crystal dropping method.

FIG. 5 shows a method for fabricating the LCD by applying the above liquid crystal dropping method. As shown, the driving device, such as the TFT, and the color filter layer are formed on the upper substrate and on the lower substrate with the TFT array process and the color filter process, respectively (S201 and S202). The TFT array process and the color filter process generally similar to those of conventional processes are preferably applied to glass substrates having a plurality of unit panel areas. Applying the liquid crystal dropping method to manufacturing of the LCD, we can use effectively a glass substrate of large area having 1000×1200 mm² or more, which is much larger than that of the conventional fabrication method. Of course, it can also be used on panels of smaller areas.

On the lower and upper substrates on which the TFT and the color filter layer are respectively formed, the alignment layers are formed and rubbed (S202 and S205). The liquid crystal is dropped onto the liquid crystal display unit panel area of the lower substrate and the sealing material is applied onto the outer portion area of the liquid crystal display unit panel area on the upper substrate (S203 and S206).

Thereafter, the upper and lower substrates are disposed facing each other and compressed to attach to each other using the sealing material. By this compression, the dropped liquid crystal evenly spreads out on entire panel (S207). By this process, a plurality of liquid crystal display unit panel areas having the liquid crystal layers therein are formed on the assembled large glass substrates (i.e., the attached lower and upper substrates). Then, the assembled glass substrates are processed and cut into a plurality of liquid crystal display unit panels (S208). The resultant liquid crystal display unit panels are inspected, thereby finishing the LCD panel process (S209).

The differences between the method for fabricating the LCD by applying the liquid crystal dispensing method shown in FIG. 5 and the method for fabricating the LCD by applying the conventional liquid crystal injection method shown in FIG. 2 will be described as follows. Of course, differences include the difference between the dropping and injecting of the liquid crystal, and the difference in the fabricating time of the larger area glass substrate. In addition, with the liquid crystal injection method shown in FIG. 2, the liquid crystal is injected through an injection opening and then the injection opening should be sealed by the sealing material. However, according to the method fabricating LCD by applying the liquid crystal dispensing method shown in FIG. 5, the liquid crystal is dropped directly onto the substrate. As a result the sealing process of the injection opening is not needed. Moreover, in the method fabricating LCD by applying the liquid crystal injection method, the panel is contacted with the liquid crystal contained in the container during injection process of the liquid crystal and as a result the outer surface of the panel is contaminated thereby requiring a cleaning process of the substrate. However, according to the method fabricating LCD by applying the liquid crystal dispensing method, the liquid crystal is directly dropped onto the substrate, and therefore, the substrate is not contaminated by the liquid crystal so that an additional cleaning process is not needed. As described above, the method for fabricating LCD by the liquid crystal dispensing method includes simpler processes than that by the liquid injection method, thereby improving the fabrication efficiency and yield.

In the method for fabricating LCD adopting the liquid crystal dispensing method, to form the liquid crystal layer having the desired thickness, the dropping position of the liquid crystal and the dropping amount of the liquid crystal should be controlled. Since the thickness of the liquid crystal layer is closely related to the cell gap of the liquid crystal display panel, especially, the exact dropping position and the dropping amount of the liquid crystal should be carefully controlled to prevent the inferiority of the liquid crystal display panel. Therefore, the present invention provides an apparatus for dropping exact amount of liquid crystal on a predetermined position.

Figure 6:
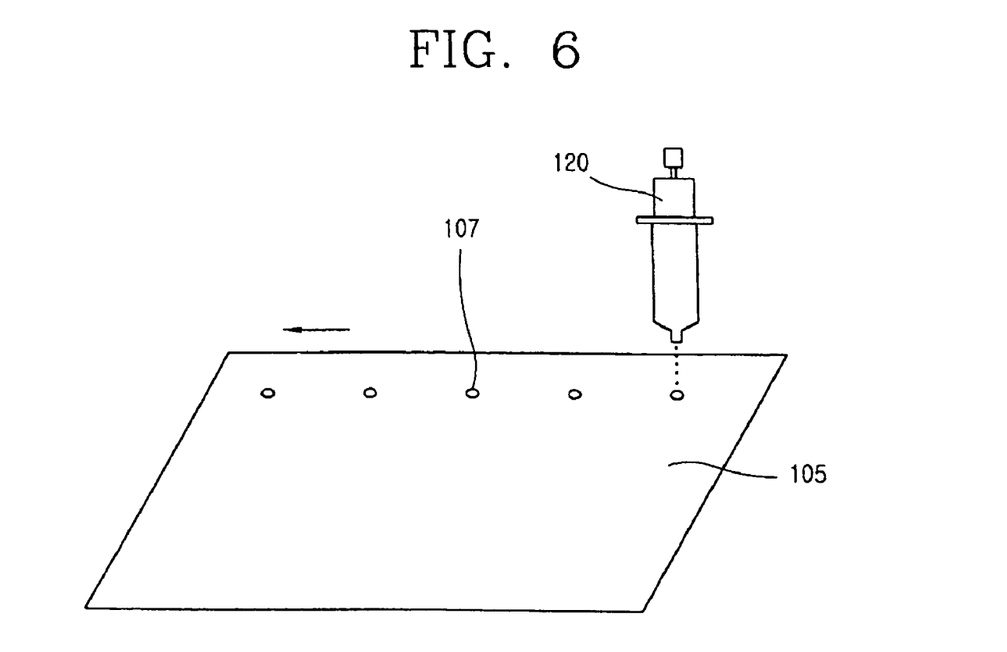
FIG. 6 is a perspective view showing the liquid crystal dropping method.

FIG. 6 is a perspective view showing a method for dropping the liquid crystal 107 onto the substrate 105 (glass substrate of larger area) using the liquid crystal dispensing apparatus 120 according to the present invention. As shown, the liquid crystal dispensing apparatus 120 is installed above the substrate 105. Although not shown in FIG. 6, the liquid crystal to be dropped onto the substrates is contained in the liquid crystal dispensing apparatus 120.

Generally, the liquid crystal 107 is dropped onto the substrate as drops. The substrate 105 preferably moves in the x and y-directions according to a predetermined speed while the liquid crystal dispensing apparatus 120 discharges the liquid crystal at a predetermined time interval. Therefore, the liquid crystal 107 dropping onto the substrate 105 is generally arranged toward x and y direction with predetermined intervals therebetween. Alternatively, the substrate 105 may be fixed, while the liquid crystal dispensing apparatus 120 is moved in the x and y directions to drop the liquid crystal 107 with a predetermined interval. However, the liquid crystal of drop shape may be trembled by the movement of the liquid crystal dispensing apparatus 120, so errors in the dropping position and the dropping amount of the liquid crystal may occur. Therefore, it is preferable that the liquid crystal dispensing apparatus 120 be fixed and that substrate 105 be moved.

Figure 7A:
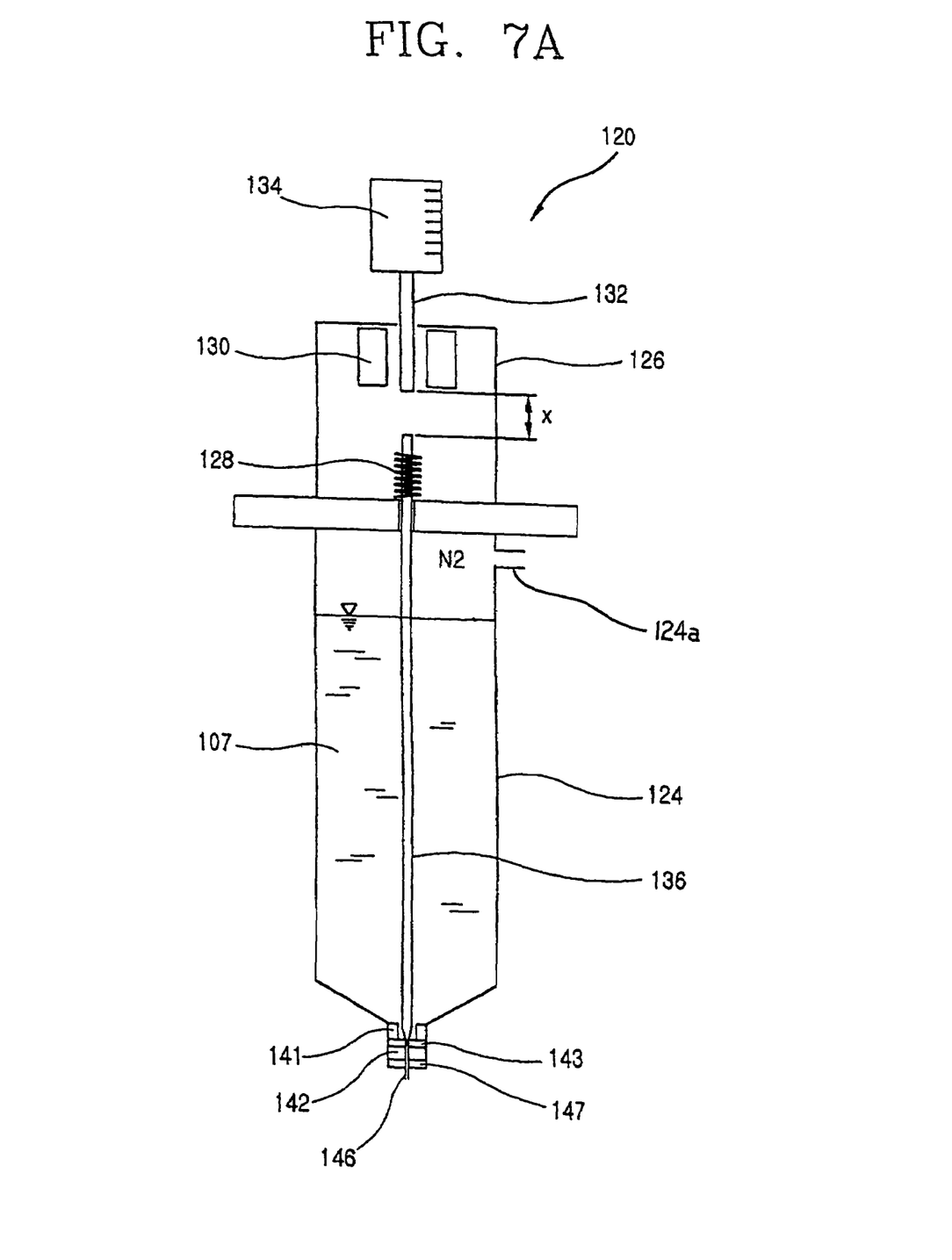
FIG. 7 is a view showing a structure of an exemplary liquid crystal dispensing apparatus according to the present invention.
Figure 7B:
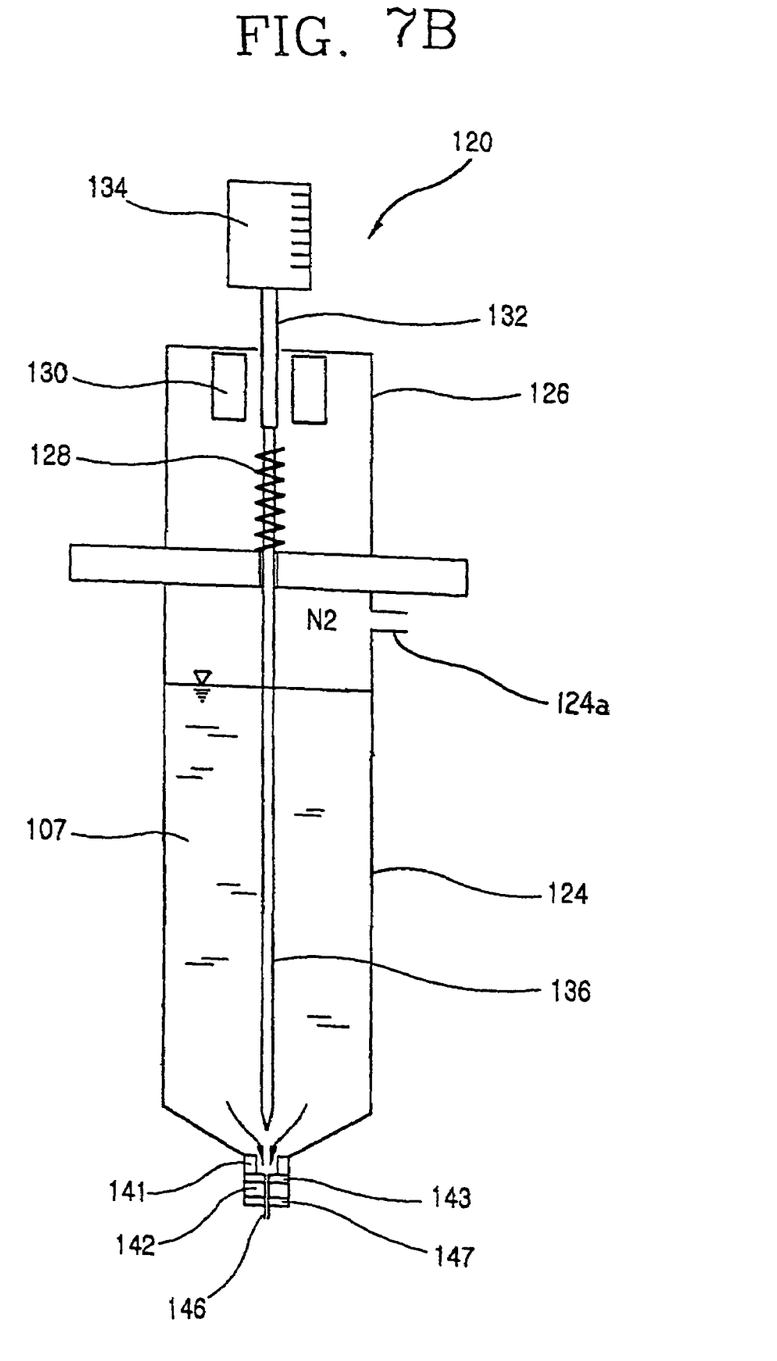
Figure 8:
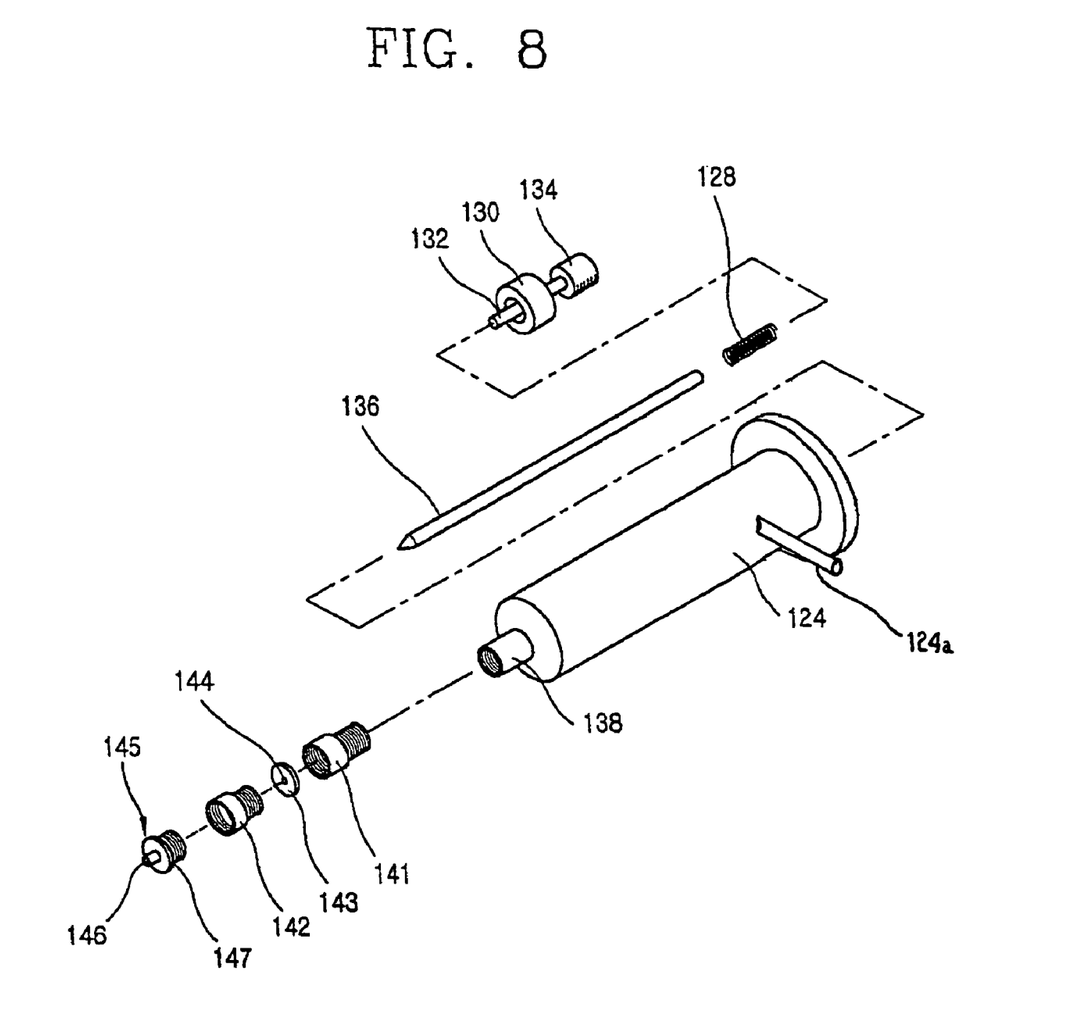
FIG. 8 is an exploded perspective view showing the liquid crystal dispensing apparatus of FIG. 7.

FIG. 7A is cross sectional view showing the liquid crystal dispensing apparatus according to the present invention when the liquid crystal is not dropped, FIG. 7B is a cross-sectional view showing the apparatus when the liquid crystal is dropped, and FIG. 8 is an exploded perspective view of the apparatus shown in FIGS. 7A and 7B. The liquid crystal dispensing apparatus according to the present invention will now be described with reference to the accompanying figures.

As shown, the liquid crystal 107 is contained in a liquid crystal container 124 of cylindrical shape. The liquid crystal container 124 may be made of a metal such as stainless steel. A gas supply tube 124a which is connected to a gas supply unit is formed on an upper part of the container. An inert gas such as nitrogen (N2) is supplied through the gas supply tube from the gas supply unit to fill the area below which the liquid crystal is contained, thereby compressing the liquid crystal 107. As a result, the liquid crystal 107 is dropped (i.e., dispensed) when the needle 136, which forms a valve with needle sheet 143, is in an up position.

In the general liquid crystal dispensing apparatus, the liquid crystal container 124 had been formed using polyethylene. Since the polyethylene has superior plasticity, a container of the desired shape can be made easily. However, the polyethylene is weak in strength, and therefore, it distorted easily even by a weak external shock. Therefore, to use a liquid crystal container made of the polyethylene, an additional case having high strength should be used to enclose the liquid crystal container. However, the structure of the liquid crystal dispensing apparatus becomes complex, and the fabrication cost is increased.

In addition, with the polyethylene liquid crystal container, if the liquid crystal container is distorted by the external forces (for example, movement of the liquid crystal dispensing apparatus, or the non-uniform pressure applied by the nitrogen) within the case, a liquid crystal discharging path (i.e., the nozzle) is also distorted. Therefore, the liquid crystal can not be dropped at the exact position due to the distorted nozzle.

However, if the liquid crystal container 124 is made of metal as described above, the structure of the liquid crystal dispensing apparatus becomes simple and the fabrication cost is reduced. Also, the dropping of the liquid crystal 107 at inexact position due to non-uniform external forces can be prevented.

A protrusion 138 is formed on a lower end portion of the liquid crystal container 124 to be connected to a first connection portion 141, as shown in FIG. 8. A nut (female threaded portion) is formed on the protrusion 138 and a bolt (male threaded portion) is formed on one side of the first connecting portion 141 so that the protrusion 138 and the first connection portion 141 are interconnected by the nut and the bolt. Of course, the connection may be formed such that the bolt is formed on the protrusion 138 and the nut is formed on the first connecting portion 141 to connect the protrusion 138 and the first connecting portion 141. The bolt and the nut act as a connection when they are formed on the objects which will be connected, and they do not need to be installed on a certain connecting objects. Therefore, the bolt and the nut which will be described hereinafter are for connecting the components, and it is not important the manner in which they are installed.

A nut is formed on the other side of the first connecting portion 141 and a bolt is formed on one side of a second connecting portion 142, so that the first connecting portion 141 and the second connecting portion 142 are interconnected. A needle sheet 143 is located between the first connecting portion 141 and the second connecting portion 142. The needle sheet 142 is inserted into the nut of the first connecting portion 141, and then the needle sheet 143 is placed between the first connecting portion 141 and the second connecting portion 142 when the bolt of the second connecting portion 142 is inserted and bolted. A discharging hole 144 is formed on the needle sheet 43, and the liquid crystal 107 (of FIGS. 7A and 7B) contained in the liquid crystal container 124 is discharged through the discharging hole 144 passing by the second connecting portions 142.

Also, a nozzle 145 is connected to the second connecting portion 142. The nozzle is for dropping the liquid crystal 107 contained in the liquid crystal container 124 as much as a small amount. The nozzle 145 comprises a supporting portion 147 including abolt connected to the nut at one end of the second connecting portion 142 to connect the nozzle 145 with the second connecting portion 142 and a discharging opening 146 protruded from the supporting portion 147 so as to drop a small amount of liquid crystal onto the substrate as a drop shape. A discharging tube extended from the discharging hole 144 of the needle sheet 143 is formed in the supporting portion 147 and the discharging tube is connected to the discharging opening 146. Generally, the discharging opening 146 of the nozzle 145 has very small diameter in order to control the fine liquid crystal dropping amount and the discharging opening 146 is protruded from the supporting portion 147. A discharge passage formed inside the nozzle 145, along with the discharge opening 146, is coated with a third fluorine resin film 148. Here, the nozzle 145 may also include a protection member to protect discharging opening 146 as described in Korean Patent Application Nos. 7151/2002 and 7772/2002 which are hereby incorporated by reference.

A needle 136 made of the metal such as the stainless steel is inserted into the liquid crystal container 124, and one end part of the needle 136 contacts with the needle sheet 143. Especially, the end of the needle contacted with the needle sheet 143 is conically shaped to be inserted into the discharging hole 144 of the needle sheet 143 so as to close the discharging hole 144.

Further, a spring 128 is installed on the other end of the needle 136 located in an upper case 126 of the liquid crystal dispensing apparatus 120 to bias the needle 136 toward the needle sheet 143. A magnetic bar 132 above which a gap controlling unit 134 is connected above the needle 136. The magnetic bar 132 is made of magnetic material such as a ferromagnetic material or a soft magnetic material, and a solenoid coil 130 of cylindrical shape is installed on outer side of the magnetic bar 132 to be surrounded thereof. The solenoid coil 130 is connected to an electric power supply unit (not shown in figure) to supply electric power thereto, thereby generating a magnetic force on the magnetic bar 132 as the electric power is applied to the solenoid coil 130.

The needle 136 and the magnetic bar 132 are separated by a predetermined interval (x). When the electric power is applied to the solenoid coil 130 from the electric power supply unit 150 to generate the magnetic force on the magnetic bar 132, the needle 136 contacts the magnetic bar 132 as a result of the generated magnetic force. When the electric power supplying is stopped, the needle 136 is returned to the original position by the elasticity of the spring 128. By the movement of the needle in up-and-down direction, the discharging hole 144 formed on the needle sheet 143 is opened or closed. The end of the needle 136 and the needle sheet 143 repeatedly contact to each other according to the supplying status of the electric power to the solenoid coil 130. Accordingly, the end of the needle 136 and the needle sheet 143 may be damaged by the repeated shock of the repeated contact. Therefore, it is desirable that the end of the needle 136 and the needle sheet 143 be preferably formed using a material which is strong with respect to shock. For example, a hard metal may be used to prevent the damage caused by the shock. As a result, the needle 136 and needle sheet 143 may be formed of stainless steel.

As shown in FIG. 7B, when the electric power is applied to the solenoid coil 130, the discharging hole 144 of the needle sheet 143 is opened by the moving of the needle 136 upward, and accordingly, the nitrogen gas supplied into the liquid crystal container 124 compresses on the liquid crystal to drop the liquid crystal 107 through the nozzle 145. The dropping amount of the liquid crystal 107 is dependant upon the opening time of the discharging hole 144 and the pressure compressed onto the liquid crystal. The opening time is determined by the distance (x) between the needle 136 and the magnetic bar 132, the magnetic force of the magnetic bar 132 generated by the solenoid coil, and the tension of the spring 128 installed on the needle 136. The magnetic force of the magnetic bar 132 can be controlled according to the winding number of the solenoid coil 130 installed around the magnetic bar 132 or the magnitude of the electric power applied to the solenoid coil 130. The distance x between the needle 136 and the magnetic bar 132 can be controlled by the gap controlling unit 134.

Although not shown, the solenoid coil 130 may be installed around the needle 136 instead of the magnetic bar 132. In this case, the needle 136 is magnetized when the electric power is applied to the solenoid coil 130 because the needle is made using a magnetic material, and therefore, the needle 136 moves upward to contact with the bar 132 because the bar 132 is fixed and the needle can move in up-and-down direction.

As described above, the liquid crystal container 124 is formed using the metal such as the stainless steel and it is connected to the nozzle through which the liquid crystal is dropped onto the substrate using the protrusion formed on the liquid crystal container 124, according to the present invention. Therefore, the liquid crystal container 124 can be easily fabricated, the fabrication cost can be reduced, and the inexact dropping of liquid crystal can be prevented effectively. However, there may some problems in the metal container as follows. That is, when the liquid crystal contacts with the metal, the metal and the liquid crystal may react chemically. By this reaction, the liquid crystal may be contaminated. As a result, the LCD using this contaminated liquid crystal may have inferiority.

Figure 9:
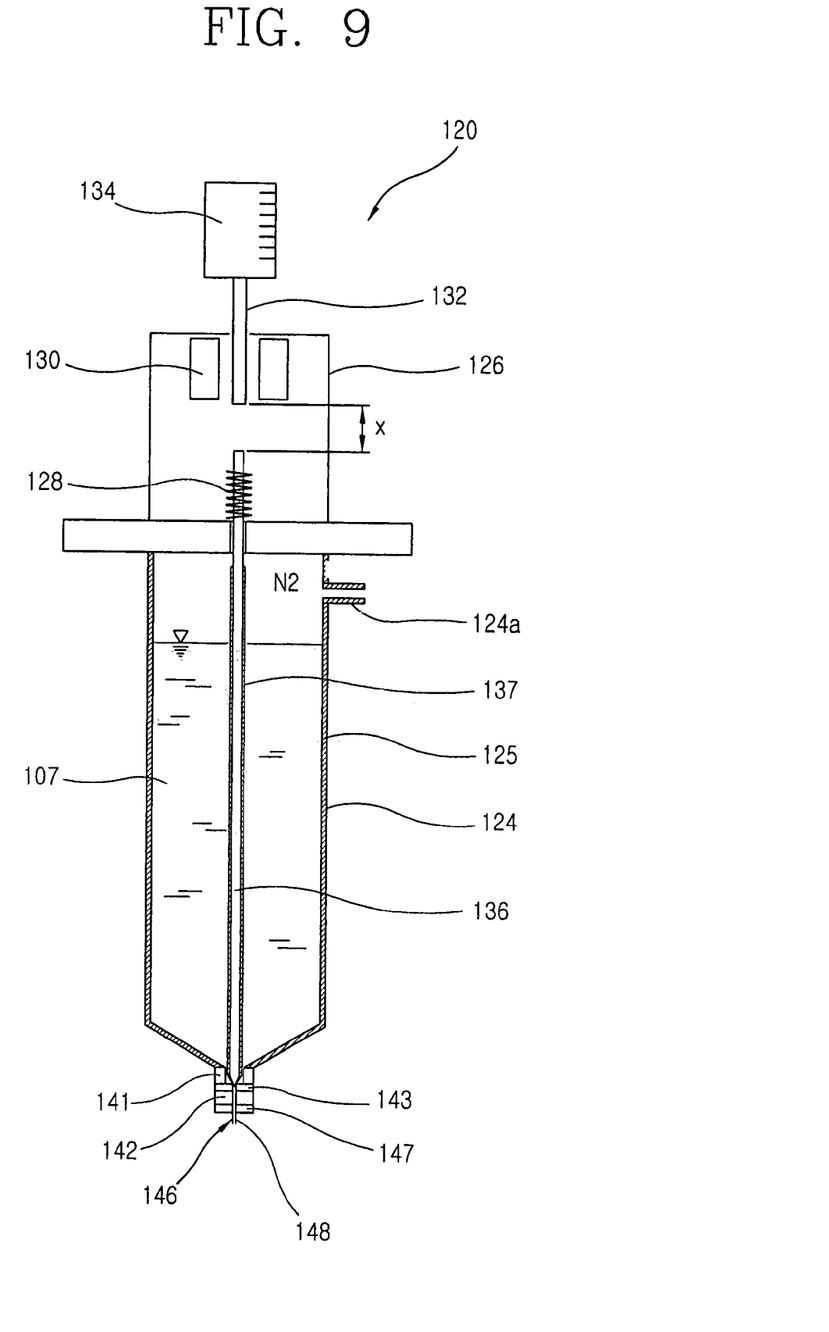
FIG. 9 is a view showing the liquid crystal dispensing apparatus in which a fluorine resin film is formed on inner side of the liquid crystal container and on the needle according to the present invention.

In the present invention, a second fluorine resin film (e.g., teflon layer) 125 is preferably formed on inner side of the metal container 124 by dipping or spraying method in order to prevent the liquid crystal from being contaminated, as shown in FIG. 9. Moreover, the fluorine resin film 125 has good characteristics such as abrasion resistance, heat resistance, and chemical resistance. Thus, the fluorine resin film 125 is able to prevent the liquid crystal from being contaminated effectively.

Since a third fluorine resin film 137 is preferably also formed on a surface of the needle 136 made of the metal, the contamination of the liquid crystal due to the chemical reaction between the metal and the liquid crystal can be prevented more effectively.

On the other hand, the fluorine resin film 125 or 137 provides low friction coefficient. The liquid crystal has the viscosity higher than that of general liquid. Therefore, when the needle 136 moves in the liquid crystal, and movement of the needle 136 is delayed by the friction between the liquid crystal and the surface of the needle 136. Although it is possible that the opening time of the discharging hole can be calculated by adding the delay of the needle movement as a variable, the amount of the liquid crystal contained in the liquid crystal container is reduced and accordingly the delaying time of the needle is also reduced. Therefore, it is difficult to drop exact amount of liquid crystal. However, in case that the fluorine resin film 137 is formed on the needle 136 as in the present invention, the friction between the fluorine resin film 137 and the liquid crystal is decreased by the low friction coefficient. Accordingly, the delay due to the movement of the needle may be trivial. Therefore, the opening time of the discharging hole 144 can be set to be constant and exact amount of the liquid crystal can be dropped.

Although the fluorine resin film 137 may be formed only on the area where the hard metal is not formed (that is, the area except the end part of the conical shape), it is desirable that the fluorine resin film is formed on entire surface of the needle 130. Because the fluorine resin film has the abrasion resistance, the fluorine resin film 137 can prevent the needle 130 from being abraded by the shock between the needle 136 and the needle sheet 143.

As described above, the liquid crystal container is preferably made of a metal such as stainless steel having pressure endurance and distortion resistance. Therefore, the structure of the liquid crystal dispensing apparatus can be simple, fabrication cost can be reduced, and the inferiority of the liquid crystal dropping caused by the distortion of the liquid crystal chamber can be prevented. Also, in accordance with the present invention, the fluorine resin film of chemical resistance is preferably formed on the inner part of the liquid crystal container and on the needle, thereby preventing the contamination of the liquid crystal due to the chemical reaction between the metal and the liquid crystal.

It will be apparent to those skilled in the art that various modifications and variations can be made in the liquid crystal dispensing apparatus of the present invention without departing from the spirit or scope of the invention. Thus, it is intended that the present invention cover the modifications and variations of this invention provided they come within the scope of the appended claims and their equivalents.

What is claimed is:

1. A liquid crystal dispensing apparatus for dispensing liquid crystal onto a substrate, comprising:

a liquid crystal container for containing the liquid crystal to be dispensed, the liquid crystal container being formed substantially entirely of a metal with a first fluorine resin film being formed on an inside surface of the liquid crystal container such that the liquid crystal directly contacts the liquid crystal container;

a gas supply connected to the container to provide a gas pressure to provide a driving force for dispensing the liquid crystal;

a needle sheet formed of a metal and disposed at a lower portion of the liquid crystal container, the needle sheet defining a discharging hole through which the liquid crystal is dispensed to the substrate; and a needle member formed substantially entirely of a ferromagnetic metal with a second fluorine resin film being formed on a surface of the needle member, the needle member being disposed in the liquid crystal container moveable between an open position and a closed position;

a biasing member to bias the needle member toward the closed position in contact with the needle sheet to prevent flow of the liquid crystal though discharging hole of the needle sheet; a solenoid disposed to provide a magnetic field such that the needle member is moved by a magnetic force to the open position such that flow of the liquid crystal through the discharging hole of the needle sheet is permitted; and a nozzle structure defining a discharging passage therein to dispense liquid crystal drops onto the substrate, the nozzle structure being formed substantially entirely of a metal with a third fluorine resin film formed on the surface of the discharging passage.

2. The liquid crystal dispensing apparatus for dispensing liquid crystal onto a substrate according to claim 1, wherein the solenoid includes a magnetic bar disposed above the needle member, a magnetic field being generated by the solenoid in the magnetic bar to magnetically attract the needle member and to move the needle member to the open position.

* * * * *